United States Patent
Li et al.

(10) Patent No.: US 12,288,321 B2
(45) Date of Patent: Apr. 29, 2025

(54) IMAGE SAMPLE GENERATING METHOD AND SYSTEM, AND TARGET DETECTION METHOD

(71) Applicant: ZHEJIANG PECKERAI TECHNOLOGY CO., LTD., Zhejiang (CN)

(72) Inventors: Yiqing Li, Zhejiang (CN); Kai Zhou, Zhejiang (CN)

(73) Assignee: ZHEJIANG PECKERAI TECHNOLOGY CO., LTD., Zhejiang (CN)

( * ) Notice: Subject to any disclaimer, the term of this patent is extended or adjusted under 35 U.S.C. 154(b) by 412 days.

(21) Appl. No.: 17/910,346

(22) PCT Filed: Sep. 8, 2020

(86) PCT No.: PCT/CN2020/113998
§ 371 (c)(1),
(2) Date: Sep. 8, 2022

(87) PCT Pub. No.: WO2021/203618
PCT Pub. Date: Oct. 14, 2021

(65) Prior Publication Data
US 2023/0162342 A1 May 25, 2023

(30) Foreign Application Priority Data
Apr. 8, 2020 (CN) .......................... 202010267813.2

(51) Int. Cl.
| | |
|---|---|
| G06T 7/00 | (2017.01) |
| G06T 5/50 | (2006.01) |
| G06T 7/70 | (2017.01) |
| G06V 10/44 | (2022.01) |

(52) U.S. Cl.
CPC .............. *G06T 7/0008* (2013.01); *G06T 5/50* (2013.01); *G06T 7/70* (2017.01); *G06V 10/44* (2022.01);
(Continued)

(58) Field of Classification Search
CPC .......... G06T 7/0008; G06T 7/70; G06T 5/50; G06T 2207/20081; G06T 2207/20221; G06V 10/44
See application file for complete search history.

(56) References Cited

U.S. PATENT DOCUMENTS 7,324,625 B2 *   1/2008   Eilbert ................... A61B 6/482
378/57
8,055,018 B2 *   11/2011   Han ...................... G06V 40/165
382/156

(Continued)

FOREIGN PATENT DOCUMENTS

| CN | 104463196 A | 3/2015 |
|---|---|---|
| CN | 109948562 A | 6/2019 |

(Continued)

OTHER PUBLICATIONS

International Search Report for PCT/CN2020/113998 mailed Jan. 8, 2021.
(Continued)

*Primary Examiner* — Gregory M Desire
(74) *Attorney, Agent, or Firm* — Sandberg Phoenix & von Gontard P.C.

(57) ABSTRACT

Provided are a target detection method and an image sample generating method and system for deep learning. The image sample generating method includes performing a scenario composition analysis on an item to be detected in a security check place; obtaining a real-shot security check image of a target scenario having a corresponding composition ratio
(Continued)

according to the scenario composition analysis; obtaining a target security check image having a label, where the target security check image is captured by a security check device; processing a pixel gray value of an i-th feature layer in the real-shot security check image and a pixel gray value of an i-th feature layer in the target security check image separately; determining images to be fused; normalizing sizes of the images to be fused; fusing the size-normalized images to be fused to form a new sample; and performing the determining the images to be fused.

5 Claims, 2 Drawing Sheets

(52) U.S. Cl.
　　　CPC ............... *G06T 2207/20081* (2013.01); *G06T 2207/20221* (2013.01)

(56) References Cited

U.S. PATENT DOCUMENTS

| | | | | |
|---|---|---|---|---|
| 9,786,070 | B2 * | 10/2017 | Chen | .......................... G06T 7/60 |
| 10,068,322 | B2 * | 9/2018 | O'Connor | ............. G06T 7/0004 |
| 10,163,200 | B2 * | 12/2018 | Heilmann | ............. G06T 7/0004 |
| 10,482,603 | B1 | 11/2019 | Fu et al. | |
| 10,742,894 | B2 * | 8/2020 | Baba | ..................... G06V 10/147 |
| 10,977,755 | B2 * | 4/2021 | Abedini | ................. G06V 20/52 |
| 2020/0090350 | A1 | 3/2020 | Cho et al. | |

FOREIGN PATENT DOCUMENTS

| | | |
|---|---|---|
| CN | 109948565 A | 6/2019 |
| CN | 110910467 A | 3/2020 |
| CN | 111145177 A | 5/2020 |
| IN | 108932735 A | 12/2018 |
| JP | H10333912 A | 12/1998 |

OTHER PUBLICATIONS

Written Opinion for PCT/CN2020/113998 mailed Jan. 8, 2021.
Chinese Office action dated May 18, 2020 from corresponding Chinese Application No. 202010267813.2 with English translation.
Chinese Office action dated Jun. 3, 2020 from corresponding Chinese Application No. 202010267813.2 with translation.
Chinese Office action dated Jun. 11, 2020 from corresponding Chinese Application No. 202010267813.2 translation.

* cited by examiner

IMAGE SAMPLE GENERATING METHOD AND SYSTEM, AND TARGET DETECTION METHOD

This is a National Stage Application filed under 35 U.S.C. 371 based on International Patent Application No. PCT/CN2020/113998, filed on Sep. 8, 2020, which claims priority to Chinese Patent Application No. 202010267813.2 filed with the CNIPA on Apr. 8, 2020, the disclosures of both of which are incorporated herein by reference in its entireties.

TECHNICAL FIELD

The present disclosure relates to the field of security check, for example, to an image sample generating method and system, and a target detection method.

BACKGROUND

The X-rays are a kind of electromagnetic radiation with a shorter wavelength than the visible light, so that the X-rays have a stronger solid and liquid penetrating ability than the visible light, and can even penetrate the steel plate of a certain thickness. As the X-rays pass through an item, the internal structure of the item having different substance composition, density and thickness can absorb the X-rays to varying degrees. The larger the density and thickness, the more rays are absorbed; and the smaller the density and thickness, the less rays are absorbed. A pixel value of the generated image reflects the density value of the physical item, so the ray intensity transmitted from the item can reflect internal structure information of the item. Typically, to have a more intuitive understanding of the substance composition of the detected item, the system sets the color of the security image obtained by the perspective. The image color of the item belonging to the organic matter is set to be orange, the image color of the item belonging to the inorganic matter is set to be blue, and the image color of the item belonging to the mixture is set to be green. The specific color difference depends on the absorption degree of the item to the x-rays. The higher the absorption degree, the darker the color is; and the lower the absorption degree, the lighter the color is. Therefore, the collected X-ray image not only has shape characteristics, but also shows different colors according to the material, and the above characteristics can be used for analysis and recognition as identifying the item. The radiation imaging technology is the mainstream technology widely used in security system by many countries. In this technology irradiates the detected item with rays (such as the X-rays), and obtains the radiographic image of the detected item by the computer processing according to the signal received by the detector, so that the security inspector can identify whether there is suspicious contraband in the image according to the shape and the ribbon of the common contraband by observing the X-ray image. Such manual interpretation method has a low efficiency, a high missing check rate and a high labor cost.

With the continuous development of the artificial intelligence technology, the deep learning technology has made breakthroughs in classification, recognition, detection, segmentation, and tracking in the field of computer vision. Compared with the conventional machine vision method, the deep convolutional neural network learns useful features from a large amount of data under the training of big data, having the advantages of high speed, high precision and low cost. The deep learning is better than the conventional method, in large part, because the deep learning is based on a large amount of data, especially in the field of security check, the deep learning requires a large amount of data. How to overcome the problem that the deep learning relies on the dataset, the mainstream approach is data enhancement, but the detection performance of the model cannot be improved simply by increasing the amount of data, difficult case samples affected by external factors such as a placement angle of the detection target, background environment and the like are also needed to restore the security check image in real scenarios. The detection accuracy and recall rate of the contraband can be improved by training the detection network, which further increases the cost of collecting and identification data.

Sample data with identified information is mainly collected by collecting a large number of on-spot real-shot images, and then manually perform information identification on the on-spot real-shot images. On the one hand, it is difficult to obtain a large number of on-spot real-shot images; and on the other hand, problems of low identifying efficiency, high labor cost, great influence of human factors, and low accuracy still exist, which makes it difficult to generate a large number of identification data required for training the model in a short time. To solve the above problems, the invention patent No. CN201910228142.6 and the invention patent No. CN201911221349.7 provide a development method for simulating real samples in terms of difficult cases. In practice, it is found that the above existing method still has problems of complex algorithm, inflexible application for different scenarios and sample effect to be improved.

SUMMARY

The present disclosure discloses an image sample generating method and system, and a target detection method, which solves problems of difficult training sample data collection and identifying for deep learning and large data amount, uses a simple algorithm to quickly provide effective training samples for detection of contraband, and can flexibly adapt to target detection tasks in different scenarios.

An image sample generating method is provided in the present disclosure and includes steps described below.

A scenario composition analysis is performed on an item to be detected in a security check place.

A real-shot security check image of a target scenario having a corresponding composition ratio is obtained according to the scenario composition analysis.

A target security check image having a label is obtained. The target security check image is captured by a security check device.

A pixel gray value of an i-th feature layer in the real-shot security check image and a pixel gray value of an i-th feature layer in the target security check image separately are processed in the following manner:

$$a_{norm}[i] = \frac{a[i]}{\text{MAX\_PIXEL\_VAL}[i]},$$

where i=1, 2, 3; $a_{norm}[i]$ is a pixel gray value of the i-th feature layer after the processing, $a[i]$ is a pixel gray value of the i-th feature layer before the processing, and MAX_PIXEL_VAL[i] is a theoretical maximum gray value of the i-th feature layer.

Images to be fused are determined. The images to be fused include at least one real-shot security check image and at least one target security check image, and a number of images to be fused is marked as N, where N≥2 and N is an integer.

Sizes of the images to be fused are normalized.

The size-normalized images to be fused are fused to form a new sample, and a fusion method is as follows: for each pixel dot (i, j, k) of the new sample, in a case where each of N pixel dots in N images to be fused corresponding to the each pixel dot (i, j, k) satisfies $a_{mean}[j][k] \geq \delta$, a pixel value of the each pixel dot (i, j, k) is $$a_{new} = \frac{1}{N} \sum_{l=1}^{N} a_{norm}^l [i][j][k];$$

and in a case where at least one pixel dot in the N images to be fused corresponding to the each pixel dot (i, j, k) does not satisfy $a_{mean}[j][k] \geq \delta$, the pixel value of the each pixel dot (i, j, k) is $a_{new} = \Pi_{l=1}^{N} a_{norm}^l [i][j][k]$, where $\delta$ is a background color threshold, $0 < \delta < 1$, l denotes an l-th picture, $1 \leq l \leq N$, $$a_{mean}[j][k] = \frac{\sum_{i=1}^{3} a_{norm}[i][j][k]}{3}$$

denotes a pixel gray value in an j-th row and k-th column of each of the size-normalized images to be fused, $a_{norm}[i][j][k]$ denotes a pixel gray value of the i-th feature layer in the j-th row and k-th column of each of the size-normalized images to be fused, $1 \leq j \leq$ a maximum number of rows of each of the size-normalized images to be fused, and $1 \leq k \leq$ a maximum number of columns of each of the size-normalized images to be fused. The steps in which the image to be fused is determined, the size of the image to be fused is normalized, and the size-normalized images to be fused is fused to form the new sample are performed repeatedly until a preset number of new samples are acquired as a sample composition for training.

An image sample generating system is further provided in the present disclosure and includes: a scenario data generating module, a target data generating module, a data preprocessing module, an image-to-be-fused preprocessing module, an image fusing module, and a sample library generating module.

The scenario data generating module is configured to perform a scenario composition analysis on an item to be detected in a security check place; and obtain a real-shot security check image of a target scenario having a corresponding composition ratio according to the scenario composition analysis.

The target data generating module is configured to obtain a target security check image having a label, where the target security check image is captured by a security check device.

The data preprocessing module is configured to process a pixel gray value of an i-th feature layer in the real-shot security check image and a pixel gray value of an i-th feature layer in the target security check image separately in the following manner:

$$a_{norm}[i] = \frac{a[i]}{MAX\_PIXEL\_VAL[i]},$$

where i=1, 2, 3; $a_{norm}[i]$ is a pixel gray value of the i-th feature layer after the processing, a[i] is a pixel gray value of the i-th feature layer before the processing, and MAX_PIXEL_VAL[i] is a theoretical maximum gray value of the i-th feature layer.

The image-to-be-fused preprocessing module is configured to determine an image to be fused, where the image to be fused includes at least one real-shot security check image and at least one target security check image, and a number of images to be fused is marked as N, where N≥2 and N is an integer; and normalize a size of the images to be fused.

The image fusing module is configured to fuse the size-normalized images to be fused to form a new sample, and a fusion method is as follows: for each pixel dot (i, j, k) of the new sample, in a case where each of N pixel dots in N images to be fused corresponding to the each pixel dot (i, j, k) satisfies $a_{mean}[j][k] \geq \delta$, a pixel value of the each pixel dot (i, j, k) is $$a_{new} = \frac{1}{N} \sum_{l=1}^{N} a_{norm}^l [i][j][k];$$

and in a case where at least one pixel dot in the N images to be fused corresponding to the each pixel dot (i, j, k) does not satisfy $a_{mean}[j][k] \geq \delta$, the pixel value of the each pixel dot (i, j, k) is $a_{new} = \Pi_{l=1}^{N} a_{norm}^l [i][j][k]$, where $\delta$ is a background color threshold, $0 < \delta < 1$, l denotes an l-th picture, $1 \leq l \leq N$, $$a_{mean}[j][k] = \frac{\sum_{i=1}^{3} a_{norm}[i][j][k]}{3}$$

denotes a pixel gray value in an j-th row and k-th column of each of the size-normalized images to be fused, $a_{norm}[i][j][k]$ denotes a pixel gray value of the i-th feature layer in the j-th row and k-th column of each of the size-normalized images to be fused, $1 \leq j \leq$ a maximum number of rows of each of the size-normalized images to be fused, and $1 \leq k \leq$ a maximum number of columns of each of the size-normalized images to be fused.

The sample library generating module is configured to perform determining the image to be fused, normalizing the size of the image to be fused, and fusing the size-normalized images to be fused to form the new sample repeatedly until a preset number of new samples are acquired as a sample composition for training.

A target detection method is further provided in the present disclosure and includes steps described below.

A security check image of an item is acquired, and the security check image is preprocessed.

A preset convolutional neural network extracts an image feature of the preprocessed security check image.

The image feature is input to a preset target detection model to obtain a target region of the security check image. The preset target detection model is obtained by training the image sample obtained by the above image sample generating method.

A detection result of the security check image is determined according to the obtained target region of the security check image. The detection result includes type information and location information of contraband.

DETAILED DESCRIPTION

Figure 1:
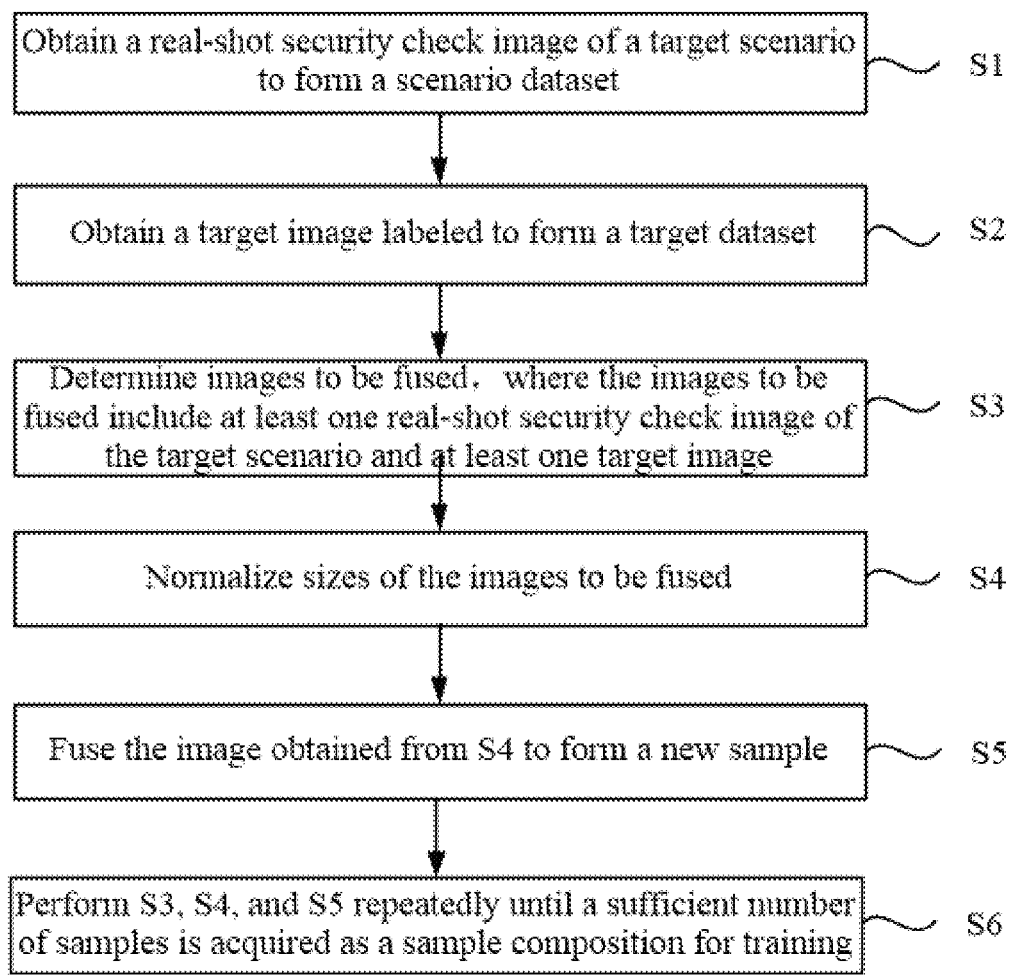
FIG. 1 is a flowchart of an image sample generating method based on deep learning provided by an embodiment of the present disclosure.

The technical solutions in the embodiment will be described in connection with the drawing in the embodiment. The embodiment described below is part, not all, of the embodiments.

First, terms relating to one or more embodiments of the present disclosure are explained.

Contraband: items that are not allowed to be manufactured, purchased, used, held, stored and transported for import or export by law, such as weapons, ammunition, explosive objects (such as explosives, detonators, fuses and the like).

Security check image: an image acquired by a security check device. The security check device or a security check machine related to the present disclosure is not limited to an X-ray security check device. The security check device and/or the security check machine that can perform security check in an imaging mode are all within the protection scope of the present disclosure, such as a terahertz imaging device and the like.

Embodiment One

As shown in FIG. 1, an image sample generating method based on deep learning is provided by the present disclosure and includes steps described below.

In S1: a real-shot security image of a target scenario is obtained to form a scenario dataset.

The target scenario includes an item, such as luggage, an express parcel, a bag, a cargo and the like, that requires the security check appears in a place such as an airport, a railway station, a bus station, a government building, an embassy, a conference center, a convention and exhibition center, a hotel, a shopping mall, a large-scale event, a post office, a school, a logistics industry, an industrial detection, an express transit depot and the like. If a target is the contraband (such as a gun or an explosive), the target scenario refers to a container in which the contraband is located, that is, a place which is configured to accommodate the contraband. In one embodiment, the target scenario does not include the target. Typically, the type of the scenario is related to the place, for example, in the place such as the airport, the railway station and the like, the luggage is the main scenario, and the scenario corresponding to the express transit depot is the express parcel. As a common phenomenon, in a case of the express transit depot, the scenario is different in the express transit depots having different geographical locations. For example, for the express transit depot located in Haining, the scenario is generally an express parcel with clothes, and for the express transit depot located in Kunshan, the majority of scenarios are an express package with electronic devices.

In different scenarios, the imaging effect is different. The X-ray security check device is used as an example, and the principle analysis is as follows. The X-rays are a kind of electromagnetic radiation with a shorter wavelength than the visible light, so that the X-rays have a stronger solid and liquid penetrating ability than the visible light, and can even penetrate the steel plate of a certain thickness. As the X-rays pass through items, the internal structures of items with different material compositions, densities, and thicknesses can absorb the X-rays to varying degrees. The larger the density and thickness, the more rays are absorbed; and the smaller the density and thickness, the less rays are absorbed. A pixel value of the generated image reflects the density value of the physical object, so the ray intensity transmitted from the object can reflect internal structure information of the item. Typically, to have a more intuitive understanding of the substance composition of the detected item, the system sets the color of the security image obtained by the perspective. The image color of the item belonging to the organic matter is set to be orange, the image color of the item belonging to the inorganic matter is set to be blue, and the image color of the item belonging to the mixture is set to be green. The specific color difference depends on the absorption degree of the item to the x-rays. The higher the absorption degree, the darker the color; and the lower the absorption degree, the lighter the color. Therefore, the collected X-ray image not only has shape characteristics, but also shows different colors according to the material, and the above characteristics can be used for analysis and recognition as identifying the item.

Based on the introduction of the above target scenario and the imaging effect, it can be known that the selection of scenario data which is essential to the sample of the present disclosure also has an emphasis according to different places. For example, for a contraband detection network provided for the transit depot with the clothes as main goods, during the detection network training, data of the express package with the clothes as the scenario is used as a sample or made into the sample in the method of the present disclosure. Therefore, when a real-shot security check image of the target scenario is obtained, a scenario composition analysis of an item to be detected in a security check place is performed, and a target scenario image having a corresponding ratio is selected.

The security check image may be acquired by using the X-ray security check device or another security check device such as the terahertz security check device. The type and the model of the security check device is not limited in this embodiment as long as the device can be configured for security check and can obtain the security check image.

In S2: a target image having a label is obtained to form a target dataset.

The type of the target is one or more, and the number of targets is one or more. The target image is captured by the security check device, the scenario in which the target is located is not set and only the target is contained in the security check image. As an example, in the field of security check, the contraband is a general name of the targets in the embodiment of the present disclosure, and the identifying personnel identifies each target to make the target become the target having the label, and identification contents include the rectangular frame and the type of the target. The more target data, the better.

Images in S1 and S2 of this embodiment may also be performed a data enhancement and then incorporated into the scenario dataset and the target dataset separately. The enhancement method includes a geometric transformation operation and/or a pixel transformation operation. The geometric transformation operation includes one or more of a rotation operation, a scaling operation and a cutting operation. Synchronous transformation of identification information is acquired while the geometric transformation. The pixel transformation operation includes one or more of a noise adding operation, a blur transformation, a perspective operation, a luminance operation and a contrast operation. In the rotation operation: the image is rotated clockwise/counterclockwise by a certain angle to reduce the probability of recognition failure caused by the inclination angle of the image. In the scaling operation: when the image sample is generated by matting, a scaling ratio is inputted, and then the scaled image is matted from the original image and then compressed into the size of the original image. In the cutting operation: a cutting process is performed on the matted image sample, so that the probability of recognition failure caused by missing or occluded image is reduced. In the noise adding operation: a noise matrix is generated according to a mean value and a Gaussian covariance, noises are added to the original image matrix, and then the validity of pixel values of multiple dots is judged. The blur transformation is achieved by a blur function of OpenCV, that is, a blur block is added to the original image. In the perspective operation, four corner dots of the original image are transformed into four new dots according to an input perspective ratio, and then dots of the whole original image are X-rayed according to a corresponding mapping relationship between the four dots before the transformation and the four dots after the transformation. The luminance operation and the contrast operation achieve the luminance operation and the contrast operation on the image by adjusting a Red Green Blue (RGB) value of each pixel.

As one embodiment of the present disclosure, the data in S1 and S2 are preprocessed, and the processing mode includes but is not limited to one or more of a processing, a denoising, a background differencing and an artifact removal of a pixel gray value. As one embodiment of the present disclosure, pixel gray values of an i-th feature layer in the data of the S1 and S2 are separately processed in the following manner:

$$a_{norm}[i] = \frac{a[i]}{MAX\_PIXEL\_VAL[i]},$$

where i=1, 2, 3; $a_{norm}[i]$ is a pixel gray value of the i-th feature layer after the processing, $a[i]$ is a pixel gray value of the i-th feature layer before the processing, and MAX_PIXEL_VAL[i] is a theoretical maximum gray value of the i-th feature layer.

In one embodiment, the feature layer is a color channel. For example, a first feature layer is a Red (R) channel, a second feature layer is a Green (G) channel, and a third feature layer is a Blue (B) channel. A corresponding relationship between a serial number of the feature layer and the color channel is not limited in this application.

In S3, images to be fused are determined. The images to be fused include at least one real-shot security check image of the target scenario and at least one target image, and the number of images to be fused is marked as N, where N is an integer greater than or equal to 2. As one embodiment of the present disclosure, one image is selected from the scenario dataset arbitrarily and one image is selected from the target dataset arbitrarily to form the images to be fused, that is, N=2.

In S4: sizes of the images to be fused are normalized.

As one embodiment of the present disclosure, the sizes of the selected images are normalized, the at least two X-ray images may be same or different, and the sizes of the at least two X-ray images may be same or different, which are both within the protection scope of the present disclosure.

The length and width of the normalized image are set according to the size of the minimum external rectangular frame of the image to be fused. The case where there are two X-ray images are used as an example, and $w_{new}=\max(w_1, w_1)$ and $h_{new}=\max(h_1, h_2)$, the length and width of the two X-ray images are (w1,h1) and (w2,h2) respectively. The size normalization process of each image is achieved by filling a newly added area of the image with a background color, so that the target in the original image cannot be changed. The background color is related to the device collecting the X-ray image and can be adjusted according to the X-ray image.

In S5: the image obtained from S4 is fused to form a new sample.

The fusing method is described below.

When pixel dots corresponding to N images on pixel dots of the new sample (i, j, k) are $a_{mean}[j][k] \geq \delta$, $$a_{new} = \frac{1}{N}\sum_{l=1}^{N} a_{norm}^{l}[i][j][k];$$

on remaining pixels, a pixel value of the new sample is set to be $a_{new}\Pi_{l=1}^{N} a_{norm}^{l}[i][j][k]$, where $\delta$ is a background color threshold, $0<\delta<1$, l is an l-th image, $$a_{mean}[j][k] = \frac{\sum_{i=1}^{3} a_{norm}[i][j][k]}{3}$$

is a pixel gray value of each of the size-normalized images to be fused, $a_{mean}[j][k]$ is a pixel gray value in a j-th row and k-th column, and $a_{norm}[i][j][k]$ is a pixel gray value of an i-th feature layer in the j-th row and k-th column.

In S6: S3, S4, and S5 are iterated repeatedly until a sufficient number of samples are acquired as a sample composition for training.

The composition of the images to be fused having pertinence can be determined according to different places, which is consistent with ideas of the step S1 in the embodiment of the present disclosure. For example, in a detection network sample for the airport, a composition ratio of the real-shot security check image of the target scenario in the image to be fused is selected according to a scenario ratio of a daily actual situation of the airport, for example, 60% of large luggage and 30% of bags are used as the target scenario.

Figure 2:
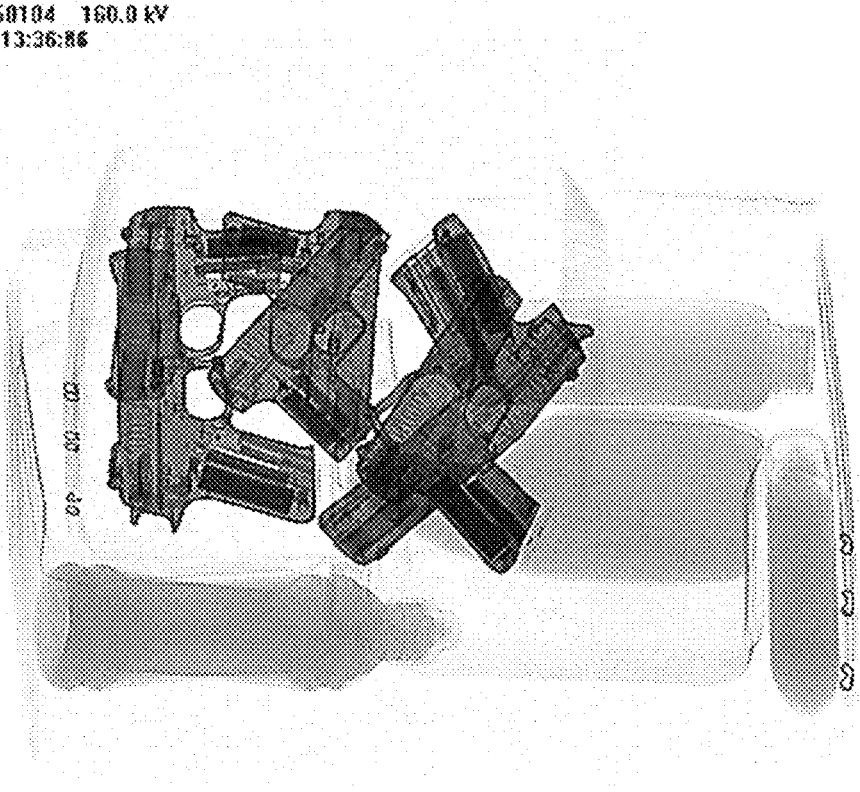
FIG. 2 is an X-ray image obtained by a sample generating method provided by an embodiment of the present disclosure.
Figure 3:
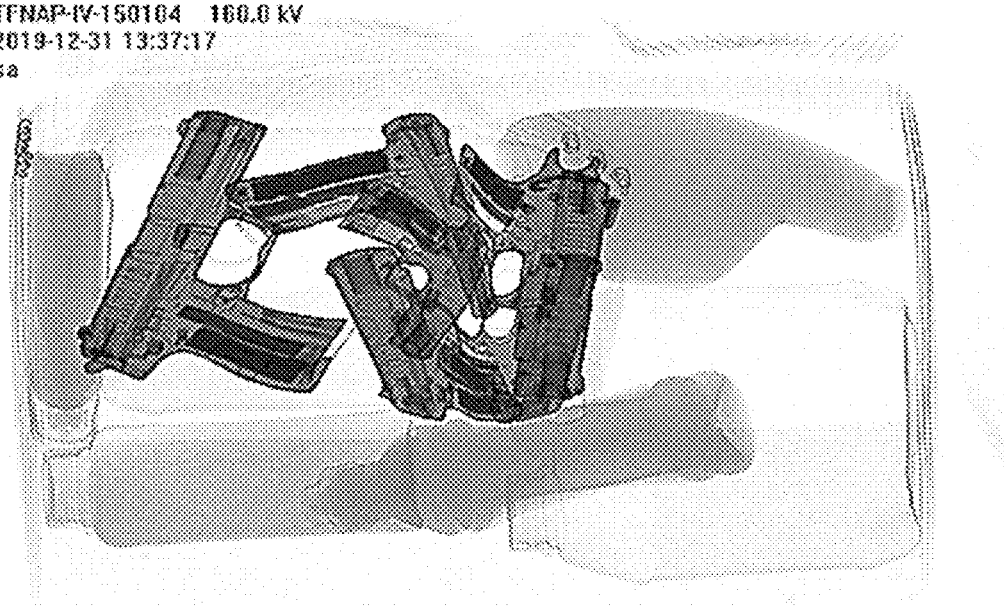
FIG. 3 is an X-ray image obtained by shooting a real item provided by an embodiment of the present disclosure.

In the image sample generating method based on deep learning in embodiment one, the real-shot security check image of the target scenario based on the analysis of the security check place is obtain, so that the target image having the label is obtained and the images to be fused are determined. In the method of obtaining the new sample by processing the images to be fused with a new fusion algorithm, there is no need to capture a large number of target images in real scenarios on the spot, and there is no need to manually identify the real-shot images in the above complicate environment. The algorithm is simple, which can flexibly and quickly generate the image of the new sample with the place pertinence. The sample has a high realism and a high identifying accuracy, provides a large number of available sample data with identification information for the model training, and solves the sample collection problem that some contraband, such as pistols and explosives, is difficult to be obtained in the field of contraband recognition. It is found that the new sample obtained by the method in the embodiment of the present disclosure shown in FIG. 2 is almost consistent with the real-shot image containing the detection target in FIG. 3 by comparison. The new sample with the color image shows a more realistic effect, has a high realism and a high identifying accuracy, provides a large number of available sample data with identification information for the model training, and further improves the efficiency and accuracy of the target detection task executed in the intelligent security check process by using the deep learning method.

Embodiment Two

An image sample generating system based on deep learning is provided and includes: a scenario dataset, a target dataset, a preprocessing module, an image-to-be-fused preprocessing module, an image fusing module, and a generated sample library.

The scenario dataset is composed of the real-shot security check image of the target scenario according to embodiment one, and the target dataset is composed of the target image having the label according to embodiment one.

The real-shot security check image and the target image are composed of X-ray images of items, and the X-ray images of items may be collected by using an X-ray security check device; and the items includes luggage, express parcels, large goods and the like.

As one embodiment of the present disclosure, data in the scenario dataset and the target dataset are preprocessed, and the processing mode includes but is not limited to one or more of a processing, a denoising, a background differencing and an artifact removal of a pixel gray value. As one embodiment of the present disclosure, pixel gray values of i-th feature layers in the data of the scenario dataset and the target dataset are respectively processed in the following manner:

$$a_{norm}[i] = \frac{a[i]}{\text{MAX\_PIXEL\_VAL}[i]},$$

where i=1, 2, 2; $a_{norm}[i]$ is a pixel gray value of the i-th feature layer after the processing, a[i] is a pixel gray value of the i-th feature layer before the processing, and MAX_PIXEL_VAL[i] is a theoretical maximum gray value of the i-th feature layer.

In one embodiment, images in the scenario dataset and the target dataset may be performed a data enhancement and the enhanced images are also components of the scenario dataset and the target dataset respectively. The enhancement method includes a geometric transformation operation and/or a pixel transformation operation.

In one exemplarily embodiment, the geometric transformation operation includes one or more of a rotation operation, a scaling operation and a cutting operation. The pixel transformation operation includes one or more of a noise adding operation, a blur transformation, a perspective operation, a luminance operation and a contrast operation. In the rotation operation: the image is rotated clockwise/counterclockwise by a certain angle to reduce the probability of recognition failure caused by the inclination angle of the image. In the scaling operation: when the image sample is generated by matting, a scaling ratio is inputted, and then the scaled image is matted from the original image and then compressed into the size of the original image. In the cutting operation: a cutting process is performed on the matted image sample, so that the probability of recognition failure caused by missing or occluded image is reduced. In the noise adding operation: a noise matrix is generated according to a mean value and a Gaussian covariance, noises are added to the original image matrix, and then the validity of pixel values of multiple dots is judged. The blur transformation is achieved by a blur function of OpenCV, that is, a blur block is added to the original image. In the perspective operation, four corner dots of the original image are transformed into four new dots according to an input perspective proportion, and then dots of the whole original image are X-rayed according to a corresponding mapping relationship between the four dots before the transformation and the four dots after the transformation. The luminance operation and the contrast operation achieve the luminance operation and the contrast operation on the image by adjusting a Red Green Blue (RGB) value of each pixel.

The image-to-be-fused preprocessing module is configured to select at least one image in the scenario dataset arbitrarily and at least one image in the target dataset arbitrarily and normalize sizes of the at least one image in the scenario dataset arbitrarily and the at least one image in the target dataset.

A size normalization module is configured to normalize sizes of N (N≥2) X-ray images taken from the original sample arbitrarily every time; the at least two X-ray images may be same or different, and the sizes of the at least two X-ray images may be same or different, which are both within the protection scope of the present disclosure. In this embodiment, the required sample quantity and quality requirements are achieved by continuously repetition of arbitrarily selection.

The length and width of the normalized image are set according to the size of the minimum external rectangular frame of the image to be fused. The case where there are two X-ray images are taken once as an example, and $w_{new}$=max$(w_1,w_1)$ and $h_{new}$=max$(h_1,h_2)$, the length and width of the two X-ray images are (w1,h1) and (w2,h2) respectively. The size normalization process of each image is achieved by filling a newly added area of the image with a background color, so that the target in the original image cannot be changed. The background color is related to the device collecting the X-ray image and can be adjusted according to the X-ray image.

The image fusing module is configured to fuse the pixel dot in each position of the image obtained by the image-to-be-fused preprocessing module, and the fusing method is as follows.

When pixel dots corresponding to N images on pixel dots of the new sample (i, j, k) are $a_{mean}[j][k] \geq \delta$, $$a_{new} = \frac{1}{N}\sum_{l=1}^{N} a_{norm}^{l}[i][j][k];$$

on remaining pixels, a pixel value of the new sample is set to be $a_{new} = \Pi_{l=1}^{N} a_{norm}^{l}[i][j][k]$, where $\delta$ is a background color threshold, $0<\delta<1$, l is an l-th image, $$a_{mean}[j][k] = \frac{\sum_{k=1}^{3} a_{norm}[i][j][k]}{3}$$

is a pixel gray value of each of the size-normalized images to be fused, $a_{mean}[j][k]$ is a pixel gray value in a j-th row and k-th column, and $a_{norm}[i][j][k]$ is a pixel gray value of an i-th feature layer in the j-th row and k-th column.

The generated sample library includes a sample image generated by the image fusing module.

The number of sample images in the generated sample library is determined by execution times of the preprocessing module, the image-to-be-fused preprocessing module and the image fusing module.

Embodiment Three

Corresponding to an image sample generating method based on deep learning, a target detection method is also provided according to the embodiment of the present disclosure and the target detection method includes steps described below.

In step 1: a security check image of an item is acquired and the image is preprocessed. The preprocessing mode includes but is not limited to one or more of a normalizing, a denoising, a background differencing and an artifact removal of the image.

The image is normalized at a preset size, the case of 500*500 is used as an example in this embodiment.

A Gaussian smoothing algorithm is used for denoising the image. A value of each dot in the Gaussian smoothed image is obtained by the weighted average of other pixel values in the image itself and the domain. For example, each pixel in the image is scanned by using a template, and a value of a pixel dot of a center of the template is replaced by a weighted average gray value of pixels in a domain determined by the template. After the Gaussian smoothing, small noises on the image are removed. Although edge information in the image is weakened to a certain extent, the edge is still preserved relative to the noises. A background differencing algorithm extracts a median gray value of the whole image (500*500) as a gray value of a background, then calculates an absolute value of a difference between a gray value of each pixel dot in the image and the background: $I_{sub}=|I_{fg}-bg|$, where bg is a median value of the whole image. It is known that foreign matter dots have a greater difference than a difference between a background dot and the gray value of the background. Therefore, the absolute value of the difference $I_{sub}$ is seen as a possibility of the pixel dot belonging to the foreign matter dots, and the larger the value, the more likely the corresponding pixel is the foreign matter dots.

In step 2: an image feature of the preprocessed security check image is extracted by a preset convolutional neural network.

In step 3: a target area of the security check image is obtained by a preset target detection model. The preset target detection model is obtained by training the image sample obtained in the method of embodiment one of the present disclosure.

The training process of the preset target detection model mainly includes steps described below.

1. The image sample obtained in the method of embodiment one of the present disclosure is collected and a training dataset is constructed. 2. The preset deep learning network model includes a feature extraction module, a target detection network and a loss calculation module; and the preset feature extraction module and the target detection network are both convolutional neural network models. 3. The feature extraction module and the target detection network are trained by the training dataset to obtain a trained deep learning target detection model.

The training process includes: the image sample obtained in the method of embodiment one of the present disclosure is input into the feature extraction module for feature extraction to obtain the image feature, then the image feature is input into the target detection network model to obtain a candidate prediction of the image, the candidate prediction is input into the loss calculation module to calculate a loss function, and the preset deep learning target detection model is trained by a gradient back transmission algorithm.

In step 4: the detection result, including information such as type information and location information of contraband, of the security check image is output.

For the above method embodiments, for simple description, the method embodiments are all expressed as a series of action combinations. However, the embodiments of the present application are not limited by the described action sequences, and according to the present application, some steps may be performed in other sequences or concurrently. Second, the embodiments described in the present disclosure are all embodiments and that the actions and modules involved are not necessarily necessary for the present application.

In the embodiments described above, the description of multiple embodiments has its own emphasis. For a part not described in detail in one embodiment, reference may be made to a related description of other embodiments.

Although the above embodiments are all applied to security check scenarios, it can be understood from the technical solution of the present disclosure that the technical solution of the present disclosure can also be applied to a scenario where the image acquisition is carried out by using the X-ray principle in addition to the security check scenarios, for example, lesion detection and analysis in a medical image computed tomography (CT) examination scenario.

What is claimed is:
1. An image sample generating method, comprising:
performing a scenario composition analysis on an item to be detected in a security check place;
obtaining a real-shot security check image of a target scenario having a corresponding composition ratio according to the scenario composition analysis;
obtaining a target security check image having a label wherein the target security check image is captured by a security check device;
processing a pixel gray value of an i-th feature layer in the real-shot security check image and a pixel gray value of an i-th feature layer in the target security check image separately in the following manner:

$$a_{norm}[i] = \frac{a[i]}{MAX\_PIXEL\_VAL[i]},$$

wherein i=1, 2, 3; $a_{norm}[i]$ is a pixel gray value of an i-th feature layer after the processing, a[i] is a pixel gray value of the i-th feature layer before the processing, and MAX_PIXEL_VAL[i] is a theoretical maximum gray value of the i-th feature layer;
determining images to be fused, wherein the images to be fused comprise at least one real-shot security check image and at least one target security check image, and a number of the images to be fused is marked as N, wherein N≥2 and N is an integer;
normalizing sizes of the images to be fused;
fusing the size-normalized images to be fused to form a new sample as follows: for each pixel point (i, j, k) of the new sample, in a case where each of N pixel points in the N images to be fused corresponding to the each pixel point (i, j, k) satisfies $a_{mean}[j][k] \geq \delta$, a pixel value of the each pixel point (i, j, k) is $$a_{new} = \frac{1}{N} \sum_{l=1}^{N} a_{norm}^{l}[i][j][k];$$

and in a case where at least one pixel point in the N images to be fused corresponding to the each pixel point (i, j, k) does not satisfy $a_{mean}[j][k] \geq \delta$, the pixel value of the each pixel point (i, j, k) is $a_{new} = \Pi_{l=1}^{N} a_{norm}^{l}[i][j][k]$, wherein $\delta$ is a background color threshold, $0 < \delta < 1$, l denotes an l-th picture, $1 \leq l \leq N$, $$a_{mean}[j][k] = \frac{\sum_{i=1}^{3} a_{norm}[i][j][k]}{3}$$

denotes a pixel gray value in a j-th row and k-th column of each of the size-normalized images to be fused, $a_{norm}[i][j][k]$ denotes a pixel gray value of the i-th feature layer in the j-th row and k-th column of each of the size-normalized images to be fused, $1 \leq j \leq a$ maximum number of rows of each of the size-normalized images to be fused, and $1 \leq k \leq a$ maximum number of columns of each of the size-normalized images to be fused; and performing the determining the images to be fused, the normalizing the sizes of the images to be fused, and the fusing the size-normalized images to be fused to form the new sample repeatedly until a preset number of new samples are acquired as a sample composition for training.

2. The method of claim 1, wherein in the target security check image, a type of a target having the label is at least one and a number of the target is at least one.

3. The method of claim 1, after obtaining the real-shot security check image of the target scenario having the corresponding composition ratio, further comprising:
performing a data enhancement on the real-shot security check image; and
after obtaining the target security check image having the label, further comprising:
performing a data enhancement to the target security check image having the label, wherein the data enhancement comprises at least one of a geometric transformation operation or a pixel transformation operation.

4. A target detection method, comprising:
acquiring a security check image of an item, and preprocessing the security check image;
extracting, by a preset convolutional neural network, an image feature of the preprocessed security check image;
inputting the image feature to a preset target detection model to obtain a target region of the security check image, wherein the preset target detection model is obtained by training the image sample obtained according to the image sample generating method of claim 1; and
determining a detection result of the security check image according to the obtained target region of the security check image, wherein the detection result comprises type information of contraband and location information of the contraband.

5. An image sample generating system, comprising: a scenario data generating module, a target data generating module, a data preprocessing module, an image-to-be-fused preprocessing module, an image fusing module, and a sample library generating module, wherein
the scenario data generating module is configured to perform a scenario composition analysis on an item to be detected in a security check place; and obtain a real-shot security check image of a target scenario having a corresponding composition ratio according to the scenario composition analysis;
the target data generating module is configured to obtain a target security check image having an label, wherein the target security check image is captured by a security check device;
the data preprocessing module is configured to process a pixel gray value of an i-th feature layer in the real-shot security check image and a pixel gray value of an i-th feature layer in the target security check image separately in the following manner:

$$a_{norm}[i] = \frac{a[i]}{\text{MAX\_PIXEL\_VAL}[i]},$$

wherein i=1, 2, 3; $a_{norm}[i]$ is a pixel gray value of the i-th of an i-th feature layer after the processing, a[i] is a pixel gray value of the i-th feature layer before the processing, and MAX_PIXEL_VAL[i] is a theoretical maximum gray value of the i-th feature layer;
the image-to-be-fused preprocessing module is configured to determine images to be fused, wherein the images to be fused comprise at least one real-shot security check image and at least one target security check image, and a number of images to be fused is marked as N, wherein $N \geq 2$ and N is an integer; and normalize a size of the images to be fused;
the image fusing module is configured to fuse the size-normalized images to be fused to form a new sample, and a fusing method is as follows: for each pixel point (i, j, k) of the new sample, in a case where each of N pixel points in N images to be fused corresponding to the each pixel point (i, j, k) satisfies $a_{mean}[j][k] \geq \delta$, a pixel value of the each pixel point (i, j, k) is $$a_{new} = \frac{1}{N} \sum_{l=1}^{N} a_{norm}^{l}[i][j][k];$$

and in a case where at least one pixel point in the N images to be fused corresponding to the each pixel point (i, j, k) does not satisfy $a_{mean}[j][k] \geq \delta$, the pixel value of the each pixel point (i, j, k) is $a_{new} = \Pi_{l=1}^{N} a_{norm}^{l}[i][j][k]$, wherein $\delta$ denotes a background color threshold, $0 < \delta < 1$, l denotes an l-th picture, $1 \leq l \leq N$, $$a_{mean}[j][k] = \frac{\sum_{i=1}^{3} a_{norm}[i][j][k]}{3}$$

denotes a pixel gray value in a j-th row and k-th column of each of the size-normalized images to be fused, $a_{norm}[i][j][k]$ denotes a pixel gray value of the i-th feature layer in the j-th row and k-th column of each of the size-normalized images to be fused, $1 \leq j \leq a$ maximum number of rows of each of the size-normalized images to be fused, and 1≤k≤a maximum number of columns of each of the size-normalized images to be fused; and the sample library generating module is configured to perform determining the images to be fused, normalizing the sizes of the image to be fused, and fusing the size-normalized images to be fused to form the new sample repeatedly until a preset number of new samples are acquired as a sample composition for training.

\* \* \* \* \*